(12) United States Patent
Queiras et al.

(10) Patent No.: US 8,186,629 B2
(45) Date of Patent: May 29, 2012

(54) METHOD AND A DEVICE FOR OPTIMIZING THE OPERATION OF PROPULSIVE PROPELLERS DISPOSED ON EITHER SIDE OF A ROTORCRAFT FUSELAGE

(75) Inventors: Nicolas Queiras, Aix en Provence (FR); Marc Salesse-Lavergne, Marseilles (FR); Paul Eglin, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 311 days.

(21) Appl. No.: 12/724,453

(22) Filed: Mar. 16, 2010

(65) Prior Publication Data
US 2010/0243792 A1    Sep. 30, 2010

(30) Foreign Application Priority Data

Mar. 27, 2009  (FR) ..................................... 09 01497

(51) Int. Cl.
*G01D 1/00* (2006.01)
*G01D 1/08* (2006.01)
*B64C 27/22* (2006.01)
(52) U.S. Cl. .................. 244/194; 244/17.13; 244/17.19
(58) Field of Classification Search .............. 244/6, 7 R, 244/8, 12.3, 17.11, 17.13, 17.19, 23 B, 175, 244/177, 194, 195, 207
See application file for complete search history.

(56) References Cited

U.S. PATENT DOCUMENTS

| 4,935,682 | A | | 6/1990 | McCuen |
| 5,131,603 | A | * | 7/1992 | Meyers ...................... 244/17.19 |
| 5,388,785 | A | | 2/1995 | Rollet et al. |
| 6,290,171 | B1 | | 9/2001 | Dequin et al. |
| 6,478,262 | B1 | | 11/2002 | Kinkead et al. |
| 2002/0011539 | A1 | | 1/2002 | Carter, Jr. |
| 2008/0294305 | A1 | * | 11/2008 | Roesch .............................. 701/3 |
| 2009/0321554 | A1 | | 12/2009 | Roesch |

FOREIGN PATENT DOCUMENTS

| EP | 0 742 141 A1 | 11/1996 |
| EP | 0 867 364 A2 | 9/1998 |
| FR | 2 689 854 A1 | 10/1993 |
| FR | 2 769 285 A1 | 4/1999 |
| FR | 2 916 418 A1 | 11/2008 |

OTHER PUBLICATIONS

French Search Report, dated Dec. 3, 2009, from corresponding French application.

* cited by examiner

*Primary Examiner* — Tien Dinh
*Assistant Examiner* — Richard R Green
(74) *Attorney, Agent, or Firm* — Brooks Kushman P.C.

(57) ABSTRACT

A method of optimizing the operation of left and right propellers disposed on either side of the fuselage of a rotorcraft including a main rotor. Left and right aerodynamic surfaces include respective left and right flaps suitable for being deflected, yaw stabilization of the rotorcraft being achieved via first and second pitches respectively of the left and right propellers, and the deflection angles of the left and right flaps are adjusted solely during predetermined stages of flight in order to minimize a differential pitch of the left and right propellers so as to optimize the operation of the left and right propellers, the predetermined stages of flight including stages of flight at low speed performed at an indicated air speed (IAS) of the rotorcraft that is below a predetermined threshold, and stages of yaw-stabilized flight at high speed performed at an indicated air speed of the rotorcraft greater than the predetermined threshold.

11 Claims, 3 Drawing Sheets

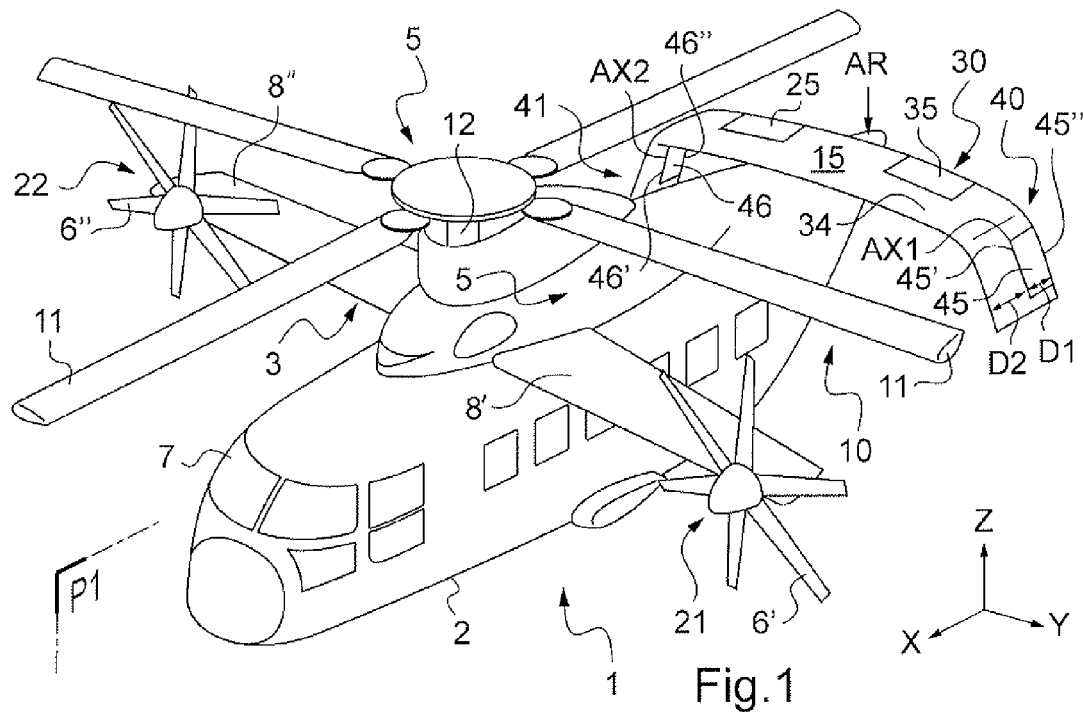
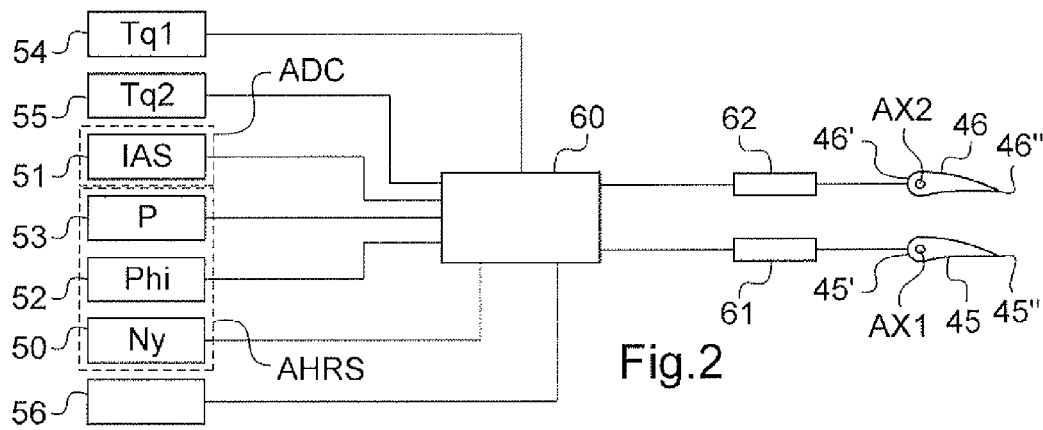
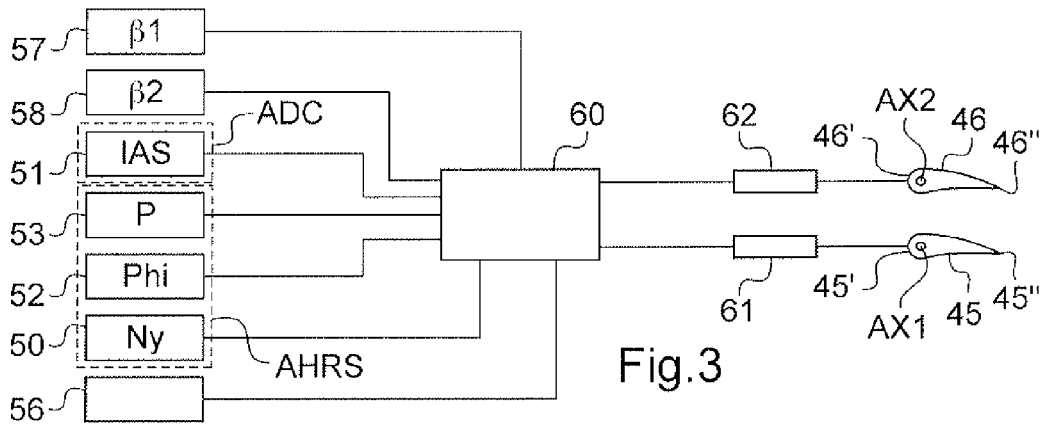

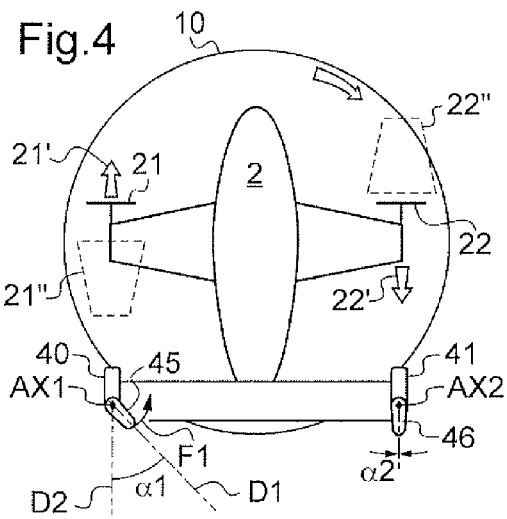
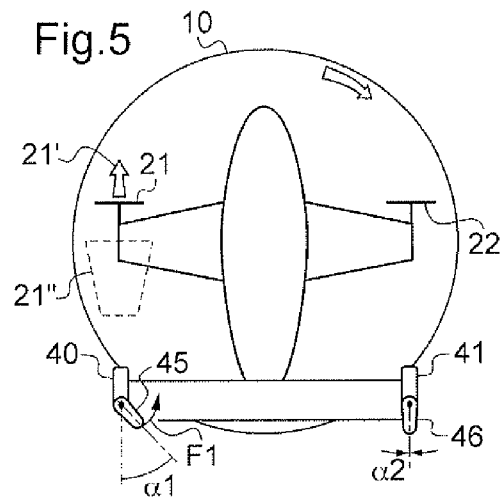
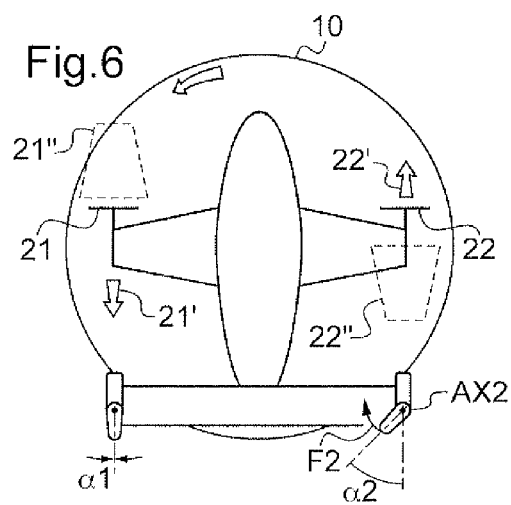
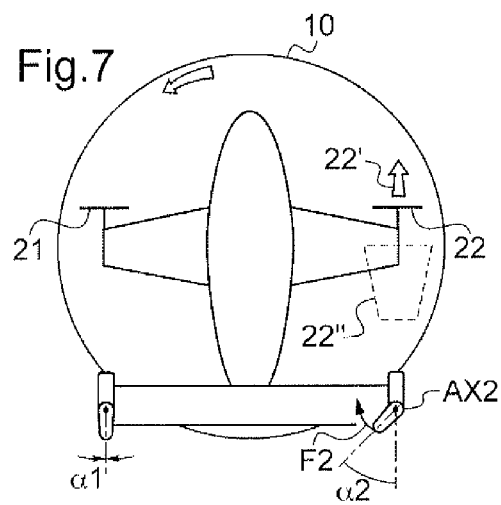

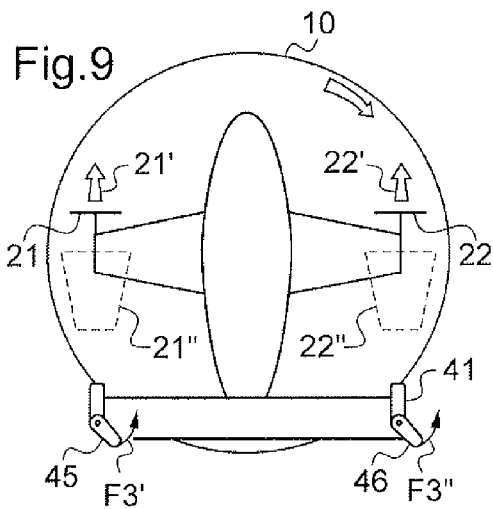
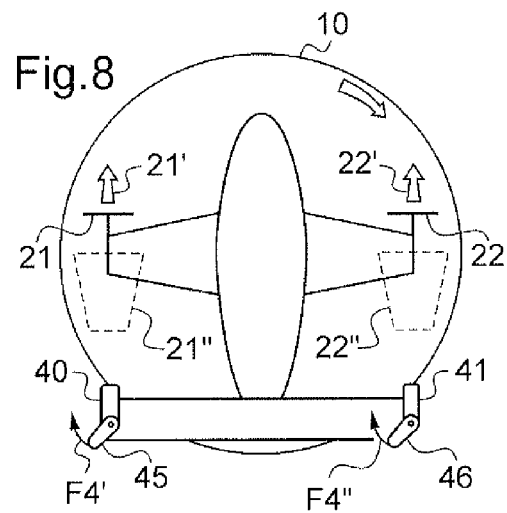
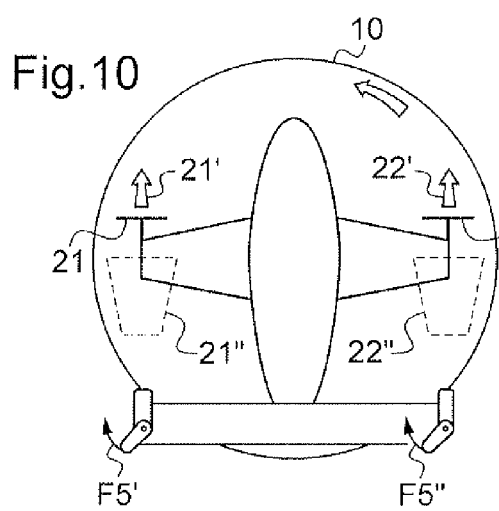
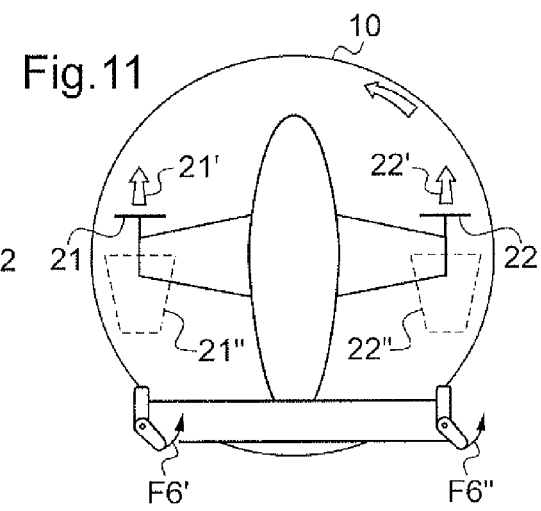

METHOD AND A DEVICE FOR OPTIMIZING THE OPERATION OF PROPULSIVE PROPELLERS DISPOSED ON EITHER SIDE OF A ROTORCRAFT FUSELAGE

FIELD OF THE INVENTION

The present invention relates to a method and to a device for optimizing the operation of left and right propulsive propellers disposed on either side of a rotorcraft fuselage.

Thus, the invention relates to a rotorcraft fitted with propulsive propellers disposed on either side of the fuselage of the rotorcraft, the main lift rotor of the rotorcraft being set into rotation by a power plant at least during a portion of a flight.

By way of example, the rotorcraft may be a hybrid helicopter.

BACKGROUND OF THE INVENTION

A hybrid helicopter relates to an advanced concept for a vertical takeoff and landing (VTOL) aircraft.

This advanced-concept hybrid helicopter, as described in document FR 2 916 418, associates at reasonable cost the effectiveness in vertical flight of a conventional helicopter with the high-speed travel performance made possible by using propulsive propellers and modern turbine engines.

Thus, a hybrid helicopter is neither a helicopter nor an autogyro nor a gyrodyne. Likewise, a hybrid helicopter is neither a compound rotorcraft nor a convertible rotorcraft.

A hybrid helicopter has a fuselage and a main lift rotor for driving blades in rotation under drive from at least one turbine engine.

Furthermore, a hybrid helicopter has a wing made up of two half-wings, with the left and right propulsive propellers being placed on either side of the fuselage, on the half-wings.

In addition, a hybrid helicopter is fitted with an integrated drive system including a mechanical transmission interconnecting the turbine engine(s), the main rotor, and the left and right propellers.

For convenience in the text below, it is assumed that the left of an aircraft is to the left of a person in said aircraft facing towards the front of the aircraft, i.e. with the back towards the rear of the aircraft. As a result, it is considered that the right of an aircraft is on the right of a person in said aircraft facing towards the front of the aircraft and with the back directed towards the rear of the aircraft.

The terms "left" and "right" as used below are thus respectively equivalent to the terms "port" and "starboard" as used at sea.

With such a configuration, the speeds of rotation of the outlet(s) from the turbine engine(s), of the left and right propellers, of the main rotor, and of the interconnecting mechanical transmission are mutually proportional, with the proportionality ratios being constant regardless of the flight configuration of the hybrid helicopter and under normal conditions of operation of the integrated drive system.

Consequently, and advantageously, the main rotor is continuously driven in rotation by the turbine engine(s) and it always develops lift regardless of the configuration of the hybrid helicopter, both in forward flight and when hovering.

Thus, during stages of flight in a normal configuration, i.e. excluding the flight configuration involving autorotation either for the purpose of engine breakdown training or as a result of a genuine engine breakdown, said at least one turbine engine is always mechanically connected to the rotor. The rotor is thus always driven in rotation by said at least one turbine engine regardless of flight stage when in a normal configuration, with it being understood that an autorotation flight configuration does not form such a normal configuration flight stage, for example.

More precisely, the main rotor serves to provide the hybrid helicopter with all of its lift during stages of take-off, landing, and hovering, and to provide some of its lift in cruising flight, with the wing then contributing part of the lift supporting said hybrid helicopter.

Thus, the main rotor provides the major fraction of the lift for the hybrid helicopter in cruising flight, possibly together with a small contribution to the propulsive or traction forces, and always with minimum drag.

Like a helicopter, the pilot has first and second control members, a collective pitch lever and a cyclic pitch stick, for example, for the purpose of controlling respectively the collective pitch and the cyclic pitch of the blades of the main rotor.

Furthermore, by modifying the pitches of the blades of the left and right propellers of the hybrid helicopter collectively and by the same amount, it is also possible to control the thrust generated by the left and right propellers.

The pilot thus has at least one third thrust control member such as a control lever, suitable for modifying the pitches of the blades of the right and left propellers collectively and by the same amount.

In contrast, the antitorque and steering functions are achieved by making use of differential thrust exerted by the left and right propellers, e.g. by the pilot making use of a differential pitch control member of the rudder-bar type.

Consequently, the third control member serves to define the mean pitch of the blades of the left and right propellers, where the mean pitch corresponds to half the sum of the first and second pitches of the blades of the left and right propellers.

In contrast, the rudder bar serves to cause the pitches of the left and right propellers to depart from the mean pitch in differential manner, with the pitch of the blades of one propeller being increased by a differential pitch value while the pitch of the blades of the other propeller is decreased by said value.

In order to provide the antitorque function on a hybrid helicopter, it is thus appropriate to obtain differential thrust, with the value and/or the direction of the thrust exerted by the left propeller necessarily being different from the value and/or the direction of the thrust exerted by the right propeller. It can thus be concluded that the first pitch of the blades of the left propeller is necessarily different from the second pitch of the blades of the right propeller in order to stabilize the hybrid helicopter in yaw.

Nevertheless, the maximum efficiency of a propeller can be obtained only for a given value for the pitch of the blades of said propeller for any given advance factor $\lambda$, where the advance factor $\lambda$ is given by:

$$\lambda = TAS/(\Omega \times R)$$

where TAS is the true air speed of the rotorcraft, $\Omega$ is the speed of rotation of the propellers, and R is the blade radius of the propellers.

Since the left and right propellers are identical, a pitch difference between said first and second pitches necessarily implies that at least one of the propellers is not operating in its best efficiency range.

This difference also gives rise to a difference between the first torque generated by the left propeller and the second torque generated by the right propeller that can, under extreme circumstances, become problematic. If one propeller is close to its maximum admissible torque, then the pilot's margin for maneuvering in yaw with the propeller that is closest to its limit consequently becomes limited.

It is possible to envisage fitting the hybrid helicopter with aerodynamic surfaces capable of generating transverse anti-torque lift, stationary fins extending substantially parallel to the plane of symmetry of the fuselage and arranges at the rear end of the fuselage.

These aerodynamic surfaces may also be fitted with rudder flaps, and electric actuators that control the flaps so as to vary their angles of deflection relative to the stationary fins to which the flaps are fastened, for the purpose of stabilizing the hybrid helicopter.

Document U.S. Pat. No. 4,935,682 describes a control device for preventing an airplane that has thrusters disposed on either side of its fuselage from beginning to perform movement in yaw in the event of the thrust generated by one of the thrusters becoming lower.

Thus, according to that Document U.S. Pat. No. 4,935,682, the control device makes use of a differential thrust signal to control the position of a steering rudder.

Document EP 0 742 141 seeks to obtain the same result by controlling the position of a rudder as a function of airplane accelerations.

Documents FR 2 689 854 and FR 2 769 285 present a helicopter provided with a steering aerodynamic surface that exerts transverse lift, said aerodynamic surface including a rudder flap of adjustable deflection angle relative to the aerodynamic surface.

Thus, according to document FR 2 689 854, the deflection angle of the flap is controlled automatically as a function of the collective pitch of the main lift rotor of the helicopter and as a function of the speed of advance of said helicopter.

Finally, document U.S. Pat. No. 6,478,262 presents an aircraft having a steering rudder that operates in conjunction with the collective pitch control to perform the yaw-control function.

Document EP 0 867 364 presents a helicopter having vertical fins, the angle of attack of the fins varying in order to control the helicopter in yaw. The effectiveness of the tail rotor is preponderant at low speed in countering the torque exerted by the main rotor on the airframe, whereas the effectiveness of the fins is preponderant at high speed.

Thus, the state of the art does not provide precise teaching for optimizing the operation of left and right propellers of a rotorcraft having a main lift rotor driven by a power plant during at least one stage of flight. The state of the art does not specify how the blades of the left and right propellers can be enabled to have pitches that are close or even equal to the given value that gives rise to maximum efficiency for each propeller.

That state of the art does no more than present means for stabilizing an aircraft and controlling it in yaw. Consequently, the above-mentioned documents do not make it possible to solve the problem that is posed.

OBJECT AND SUMMARY OF THE INVENTION

An object of the present invention is thus to propose a method and a device that make it possible to optimize the operation of the left and right propellers of a rotorcraft having a main lift rotor driven by a power plant during at least one stage of flight, or indeed continuously in the context of a hybrid helicopter.

Thus, the invention relates to a method of optimizing the operation of a left propeller and a right propeller disposed on either side of the fuselage of a rotorcraft and suitable for generating respective propulsive air streams, the rotorcraft having a main lift rotor and a power plant suitable for rotating the left and right propellers and the main rotor, the rotorcraft also including a left aerodynamic surface and a right aerodynamic surface exerting transverse lift, said left and right aerodynamic surfaces are arranged respectively in line with said left and right propellers on a stabilizer located in the vicinity of the rear end of said fuselage.

The method is remarkable in particular in that the left and right aerodynamic surfaces include respective a left flap and a right flap suitable for being deflected to present a deflection angle relative to the associated aerodynamic surface, with yaw stabilization of the rotorcraft being provided by means of first and second pitches respectively of the left and right propellers, and with adjustment of the deflection angles of the left and right flaps being activated solely during predetermined stages of flight in order to minimize a differential pitch of the left and right propellers so as to optimize the operation of the left and right propellers, said predetermined stages of flight including stages of flight at low speed performed at an indicated air speed of the rotorcraft that is less than a predetermined threshold and stages of yaw-stabilized flight at high speed performed at an indicated air speed of the rotorcraft that is greater than said predetermined threshold, said differential pitch being equal to half the difference between a first pitch for the blades of the left propeller and a second pitch for the blades of the right propeller.

It is recalled that for convenience in the text below, it is assumed that the left of an aircraft is to the left of a person in said aircraft facing towards the front of the aircraft, i.e. with the back towards the rear of the aircraft. As a result, it is considered that the right of an aircraft is on the right of a person in said aircraft facing towards the front of the aircraft and with the back directed towards the rear of the aircraft.

Thus, the left propeller, the left aerodynamic surface, and the left flap of the rotorcraft are on the left of a person in the rotorcraft and facing towards the front of the rotorcraft with the back turned towards the rear thereof. In contrast, the right propeller, the right aerodynamic surface, and the right flap of the rotorcraft are on the right of a person in the rotorcraft facing towards the front of the rotorcraft with the back turned towards the rear thereof.

It is also recalled that indicated air speed corresponds to the air speed as indicated by an a barometer airspeed instrument of the rotorcraft, corrected for the effects of the compressibility of air in standard atmospheric conditions at sea level, and not corrected for errors of the barometer air speed circuit. Reference can be made to the existing literature to obtain more information about instruments for measuring indicated air speed.

Consequently, according to the invention, use is made of left and right flaps having their leading edges fastened respectively to the left and right aerodynamic surfaces, these left and right aerodynamic surfaces being substantially vertical i.e. substantially parallel to the longitudinal plane of symmetry of the rotorcraft fuselage. Unlike the teaching of document EP 0 867 364, the left and right flaps do not serve to stabilize the rotorcraft, advantageously a hybrid helicopter, but seek to solve a problem defined in innovative manner concerning balancing the left and right propellers so as to optimize their operating points during stabilized flight.

For a large range of forward speeds, regulating the deflection angles of the left and right flaps serves to obtain the same pitch on each propeller and thus behavior that is optimum in terms of operating points. The first pitch of the blades of the left propeller is close or even equal to a given pitch at which the left propeller has maximum efficiency, and the second pitch of the blades of the right propeller is close or even equal to a given pitch at which the right propeller is at maximum efficiency.

It is then possible to use a left propeller that is identical to the right propeller without that presenting difficulties. The operating points of the left and right propellers, corresponding in fact to the thrusts generated by the propellers, are also in balance, thus making it possible in particular to optimize the dimensioning of the structure of the aircraft and also of the mechanical transmission connecting the power plant to each propeller.

Thus, during the predetermined flight stages, at least one flap is optionally deflected so that it contributes to the action opposing the torque generated by the main rotor. With said flap taking up a fraction of the torque in stabilized flight, it becomes possible to reduce or even eliminate the differential pitch of the blades of the left and right propellers, thus enabling their operation to be optimized.

The left and right flaps thus balance the left and right propellers during a predetermined flight stage.

The first torque generated by the left propeller and the second torque generated by the right propeller are thus made symmetrical because of the way the deflection angles of the left and right flaps are managed. The torque generated by the more heavily loaded propeller is then at a distance from its maximum torque, thereby increasing the maneuverability margin in yaw of the rotorcraft and the lifetime of the mechanical transmissions connecting the left and right propellers to a power plant.

Regulating the deflection angles of the left and right flaps represents merely a secondary regulation loop. This is because the adjustment means, by acting on the pitches of the blades of the left and right propellers, ensure yaw stabilization of the rotorcraft as a priority via a main regulation loop, whereas the regulation of the deflection angles of the left and right flaps seeks to provide long-term torque balance at each of the propellers.

It should be observed that the expression "deflect a flap" is used to mean any action serving to cause the flap to pivot about an axis fastening the leading edge of the flap to the associated aerodynamic surface, with pivoting of the flap consisting in moving the trailing edge of the flap in clockwise or counterclockwise rotation.

In addition, saying that the pivot rotation is "clockwise" or "counterclockwise" is meaningful only when it is specified from where the rotorcraft is observed. Specifically, the convention used in the present description is that the rotorcraft is observed as seen from above. The main rotor of the rotorcraft is located on the top of the rotorcraft while its landing gear is on the contrary located under the rotorcraft.

The method also possesses one or more of the following additional characteristics.

Thus, when the indicated air speed of the rotorcraft is less than a predetermined threshold, of the order of 50 knots or 25.7 meters per second for example, with the main rotor being driven in rotation by the power plant in a first direction of rotation and generating yaw torque on the fuselage that is opposed in particular by a propeller propelling a stream of air towards the rear of the rotorcraft, the deflection angle of the flap receiving said stream of air directed towards the rear of the rotorcraft is regulated by causing the flap to pivot about its fastening axis in a second direction opposite to said first direction in order to reach a maximum deflection angle relative to the associated aerodynamic surface.

Thus, the flap situated in said stream of air is maximally deflected so that the pressure exerted by the stream of air on the flap is at a maximum.

In this way, the flap situated in said stream of air serves to balance the left and right propellers by contributing to the antitorque force opposing the torque generated by the main rotor. The differential pitch of the left and right propellers is thus reduced.

In addition, when hovering, reducing said differential pitch of the left and right propellers gives rise to a non-negligible reduction in the overall power consumed by the left and right propellers.

In forward flight, piloting comfort is optimized insofar as the differential pitch control member is centered during most flight stages.

In addition, on a hybrid helicopter, hovering flight may be achieved either by setting the propeller pitches so that the propellers generate thrust of the same value but in opposite directions, or by setting the propeller pitches so that only one propeller is exerting thrust, to the detriment of a nose-up attitude.

Under such circumstances, the reduction in power consumption has the particular consequence of reducing the resulting thrust and thus of reducing the nose-up attitude needed when hovering to balance the longitudinal component of the force that results from the thrust from the propellers when only one propeller is being used while hovering.

Consequently, when the indicated air speed of the rotorcraft is less than a predetermined threshold, of the order of 50 knots or 25.7 meters per second for example, with the main rotor being driven in rotation by the power plant in a clockwise direction as seen from above, the deflection angle of the left flap is regulated by causing the left flap to pivot in a counterclockwise direction as seen from above in order to reach a maximum deflection angle relative to the left aerodynamic surface.

In contrast, when the indicated air speed of the rotorcraft is below said predetermined threshold, with the main rotor being driven in rotation by the power plant in a counterclockwise direction as seen from above, the deflection angle of the right flap is regulated by causing said right flap to pivot in a clockwise direction as seen from above in order to reach a maximum deflection angle relative to the right aerodynamic surface.

Furthermore, when the indicated air speed of the rotorcraft is above said predetermined threshold, regulation of the deflection angle of the left and right flap is activated if the following conditions concerning yaw-stabilized flight are satisfied:

$|Ny|<0.075$ times the acceleration due to gravity;
$|Phi|<5$ degrees;
$|P|<10$ degrees per second; and
the pilot is not exerting any force on a differential pitch control member such as a rudder bar suitable for ordering differential variation of the first and second pitches of the blades of the left and right propellers;

where $|Ny|$ represents the absolute value of the load factor of the rotorcraft in a transverse direction in the frame of reference of the rotorcraft, $|Phi|$ represents the absolute value of the roll angle of the rotorcraft, and $|P|$ represents the absolute value of the angular speed in roll of the rotorcraft.

It should be observed that outside the above-specified conditions, the left and right flaps are kept in position so that their deflection angles are not modified.

In a first preferred variant, and with regulation of the deflection angles of the left and right flaps being activated: measurements are made in real time firstly of a first torque generated by the left propeller as a percentage of the maximum torque that can be generated by said left propeller, and secondly of a second torque generated by the right propeller as a percentage of the maximum torque that can be generated by said right propeller, and then a first difference is determined in real time representing the second torque minus the first torque, and:

the left and right flaps are caused to be deflected so as to pivot in the clockwise direction when said first difference is greater than +2.5 percent;

said left and right flaps are caused to be deflected so as to pivot in the counterclockwise direction when said first difference is less than −2.5 percent; and said left and right flaps are kept in position when said first difference lies in the range −2.5 percent to +2.5 percent in order to avoid sustaining oscillations about the target.

Thus, if the main rotor is driven in rotation by said power plant in a clockwise direction as seen from above and if regulation of the deflection angle of the left and right flap is activated:

the left and right flaps are caused to deflect by pivoting in the clockwise direction about their axes fastening them to the associated aerodynamic surfaces when the first difference is greater than +2.5 percent;

said left and right flaps are caused to deflect by pivoting in the counterclockwise direction about their axes fastening them to the associated aerodynamic surfaces when the first difference is less than −2.5 percent; and said left and right flaps are kept in position when the first difference lies in the range −2.5 percent to +2.5 percent in order to avoid sustaining oscillations about the target.

In contrast, if the main rotor is driven in rotation by said power plant in a counterclockwise direction as seen from above and if regulation of the deflection angle of the left and right flap is activated:

the left and right flaps are caused to deflect by pivoting in the clockwise direction about their axes fastening them to the associated aerodynamic surfaces when the first difference is greater than +2.5 percent;

said left and right flaps are caused to deflect by pivoting in the counterclockwise direction about their axes fastening them to the associated aerodynamic surfaces when the first difference is less than −2.5 percent; and said left and right flaps are kept in position when the first difference lies in the range −2.5 percent to +2.5 percent in order to avoid sustaining oscillations about the target.

In a second variant, with regulation of the deflection angles of the left and right flaps being activated, measurements are performed in real time of a first pitch of the left propeller and of a second pitch of the right propeller and then a second difference is determined in real time representing the second pitch minus the first pitch, and:

said left and right flaps are caused to deflect by pivoting in the clockwise direction when the second difference is greater than 0.3 degrees;

said left and right flaps are caused to deflect by pivoting in the counterclockwise direction when the second difference is less than −0.3 degrees; and said left and right flaps are kept in position when the second difference lies in the range −0.3 degrees to 0.3 degrees.

In a third variant, with the regulation of the deflection angle of the left and right flaps being activated: there are determined in real time firstly a first power consumed by the left propeller equal to the first speed of rotation $\Omega 1$ of the left propeller multiplied by the first torque generated by the left propeller, and secondly a second power consumed by the right propeller equal to the second speed of rotation $\Omega 2$ of the right propeller multiplied by the second torque generated by the right propeller, and then a third difference is determined in real time representing the second power minus the first power, and:

the left and right flaps are caused to deflect by pivoting clockwise when said third difference is greater than +50 kilowatts;

said left and right flaps are caused to deflect by pivoting in the counterclockwise direction when said third difference is less than −50 kilowatts; and said left and right flaps are kept in position when said third difference lies in the range −50 kilowatts to +50 kilowatts in order to avoid sustaining oscillations about the target.

In addition to the above-described method, the invention provides a rotorcraft implementing the method.

According to the invention, a rotorcraft is provided with a main lift rotor together with a left propeller and a right propeller disposed on either side of a fuselage, the rotorcraft has a power plant suitable for setting the left and right propellers and also the main rotor into rotation, and the rotorcraft has a left aerodynamic surface and a right aerodynamic surface exerting transverse lift arranged respectively in line with the left and right propellers on a stabilizer located in the vicinity of a rear end of said fuselage, which rotorcraft is remarkable in particular in that the left and right aerodynamic surfaces include respective left and right flaps, the left and right flaps being suitable for being deflected respectively by first and second control means so as to present respective deflection angles relative to the associated aerodynamic surfaces, and the rotorcraft includes:

first speed measurement means for measuring the indicated air speed of said rotorcraft;

second speed measurement means for measuring the angular speed of said rotorcraft in roll;

a force sensor suitable for determining whether a pilot is exerting a force on a differential pitch control member of the rudder-bar type of the rotorcraft;

an angle sensor measuring the roll angle of the rotorcraft;

an acceleration sensor measuring the load factor of the rotorcraft in a transverse direction;

first and second torque sensors for sensing the torques of the left and right propellers or first and second pitch measurement means for measuring the pitches of the left and right propellers, or first and second torque sensors for measuring the torques of the left and right propellers and first and second rotary speed sensors for sensing the speeds of rotation of the left and right propellers; and control means suitable for causing said left and right flaps to deflect by implementing the method of the invention on the basis of information coming from the first and second speed measurement means, from the force, angle, and acceleration sensors, and from first and second torque sensors or from said first and second pitch measurement means or from the first and second torque sensors and from the first and second rotary speed sensors.

Advantageously, the rotorcraft is a hybrid helicopter, the speeds of rotation of the outlet(s) of the turbine engine(s), of the left and right propellers, of the main rotor, and of a mechanical transmission interconnecting the turbine engines, the propellers, and the rotor are mutually proportional, the ratio of proportionality being constant regardless of the flight configuration of the hybrid helicopter under normal conditions of operation of the integrated drive system.

BRIEF DESCRIPTION OF THE DRAWINGS

The invention and its advantages appear in greater detail from the following description of embodiments given by way of illustration with reference to the accompanying figures, in which:

FIG. 1 is an isometric view of a hybrid helicopter;

FIG. 2 is an explanatory diagram showing the means implemented by the invention in a preferred first variant;

FIG. 3 is an explanatory diagram showing the means implemented by the invention in a second variant;

FIGS. 4 and 5 are plan views explaining the operation of the rotorcraft at low speed with a main rotor turning clockwise when seen from above;

FIGS. 6 and 7 are views from above explaining the operation of the rotorcraft at low speed with a main rotor turning counterclockwise when seen from above;

FIGS. 8 and 9 are plan views explaining the operation of the rotorcraft at high speed with a main rotor turning clockwise when seen from above; and FIGS. 10 and 11 are plan views explaining the operation of the rotorcraft at high speed with a main rotor turning counterclockwise when seen from above.

Elements shown in more than one of the figures are given the same references in each of them.

MORE DETAILED DESCRIPTION

It should be observed that FIG. 1 shows three mutually orthogonal directions X, Y, and Z.

The direction X is referred to as the longitudinal direction and the direction Y as the transverse direction.

Finally, the third direction Z is referred to as the elevation direction.

FIG. 1 shows a hybrid helicopter 1 comprising a fuselage 2 with a cockpit 7 at the front, a main rotor 10 for driving blades 11 in rotation firstly by virtue of a power plant 5' having two turbine engines 5 disposed on top of the fuselage 2 on either side of the longitudinal plane of symmetry P1 of the fuselage 2, and secondly by virtue of a first main gearbox.

It should be observed that the two turbine engines 5 are not visible in FIG. 1 because of the presence of fairings.

Furthermore, the hybrid helicopter 1 has a high wing 3 made up of two half-wings 8' and 8" attached to the top of the fuselage 2.

The hybrid helicopter 1 is propelled in particular by a left propeller 21 and a right propeller 22 driven by the two turbine engines 5, each propeller 21, 22 being located at a respective outer end of the wing 3. The left and right propellers 21 and 22 have respectively six first blades 6' and six second blades 6" in the example shown.

Furthermore, in the vicinity of the rear end AR of the fuselage 2, there is provided a horizontal stabilizer 15 with two pitch controls 25 and 35 that are movable relative to a front portion 34. The stabilizer 15 is also provided with a left aerodynamic surface 40 and a right aerodynamic surface 41 suitable for generating transverse lift directed substantially along the direction of the stabilizer 15.

More precisely, the left and right aerodynamic surfaces 40 and 41 are arranged on either side of the stabilizer 15 so as to lie respectively in line with the left and right propellers 21 and 22. The horizontal stabilizer 15 and the left and right aerodynamic surfaces 40 and 41 form a U-shape that is upside-down relative to the fuselage 2.

Furthermore, these left and right aerodynamic surfaces 40 and 41 are substantially vertical, and thus parallel to the longitudinal plane of symmetry P1 of the fuselage 2.

In addition, the left and right aerodynamic surfaces 40 and 41 are provided respectively with a left flap 45 and a right flap 46.

A first fastener axis AX1 serves to fasten the leading edge 45' of the left flap to the left aerodynamic surface. First control means (not shown in FIG. 1), e.g. a rotary actuator, are then suitable for causing the left flap to pivot about its first fastener axis AX1 so as to offset the trailing edge 45" of the left flap in clockwise or counterclockwise directions when seen from above.

The first control means thus enable the deflection angle of the left flap 45 to be regulated relative to the left aerodynamic surface 40, i.e. the acute angle between the longitudinal axis running along a longitudinal direction D1 of the left flap 45 and the longitudinal axis passing along the longitudinal direction D2 of the left aerodynamic surface.

Likewise, a second fastener axis AX2 serves to fasten the leading edge 46' of the right flap to the right aerodynamic surface 41. Second control means (not shown in FIG. 1), e.g. a rotary actuator, are then suitable for causing the right flap 46 to pivot about its second fastener axis AX2 in such a manner as to move the trailing edge 46" of the left flap 46 clockwise or counterclockwise when seen from above.

The second control means thus enable the deflection angle of the right flap 46 to be regulated relative to the right aerodynamic surface 41.

Reference can be made to the literature to find descriptions of means for controlling a flap, sometimes called a trailing edge flap.

In order to control the collective pitch and the cyclic pitch of the blades 11 of the main rotor 10, the pilot makes use of respective first and second conventional control members.

Similarly, in order to control forward movement of the hybrid helicopter, the pilot has a third thrust control member serving to modify the mean pitch of the first and second blades 6', 6" of the left and right propellers 21, 22.

More precisely, the thrust control acts identically on the first and second pitches of the first and second blades 6', 6" in order to obtain collective variation of said first and second pitches. For example, the pilot might request a 5% increase in the mean pitch of all of propeller blades in order to increase the resultant thrust as generated in particular by the left and right propellers 21 and 22, said mean pitch of the blades of the left and right propellers 21 and 22 being equal to half the sum of the first and second pitches of the first and second blades 6', 6".

The thrust control may comprise a lever that acts on a drive system connected to the first and second propellers.

Alternatively, or in addition, thrust control may optionally be provided with a button suitable for controlling at least one actuator located in said drive system. The button advantageously has three positions, namely a first position requesting an increase in the mean pitch of the blades of the left and right propellers 21 and 22, and thus a collective variation by the same amount of the first and second pitches of the first and second blades 6', 6", a second position requesting a reduction in the first and second pitches of the first and second blades 6', 6", and finally a third position requesting no modification to the first and second pitches of the first and second blades 6', 6".

In order to control the yaw attitude of the hybrid helicopter, the pilot has a differential pitch control member of the rudder-bar type for giving rise to variation that is no longer collective but rather differential in the first and second pitches of the first and second blades 6', 6".

In order to optimize operation and in particular the operating points of the left and right propellers 21, 22, the invention proposes a novel adjustment method and device.

With reference to FIG. 2, in a first variant, the adjustment device comprises:

A force sensor 56 suitable for determining whether the pilot is exerting a force on the rudder bar of the rotorcraft. This force sensor is advantageously a force sensor integrated in the rudder-bar trim actuator. It delivers a Boolean signal that is "TRUE" when the pilot is acting on the rudder bar and "FALSE" when the pilot is not acting on the rudder bar.

First speed measurement means 51 for measuring the indicated air speed (IAS) of the rotorcraft. These first measurement means are constituted for example by the measuring instrument known as an "air data computer" (ADC) by the person skilled in the art.

First and second torque sensors 54, 55 for sensing first and second torques Tq1, Tq2 generated respectively by the left and right propellers 21, 22. The first and second torque sensors 54, 55 are advantageously master torque type sensors. Nevertheless, the first and second torque sensors 54, 55 may be computers that determine the first and second torques Tq1, Tq2 from the pitch of the blades of the corresponding propeller, from their speed of rotation, from atmospheric conditions, and from the forward air speed indicated in particular by the air data computer ADC instrument. The first and second torques Tq1, Tq2 are expressed as percentages of the maximum torque that can be generated by the left and right propellers 21, 22.

Second speed measurement means 53 for measuring the angular speed P in roll, the second speed measurement means 53 forming part of a measurement instrument known as the "attitude and heading reference system" (AHRS) to the person skilled in the art.

An angle sensor 52 measuring the roll angle Phi of the rotorcraft, the angle sensor 52 forming part of the AHRS measurement instrument.

An acceleration sensor 50 measuring the load factor Ny of the rotorcraft in a transverse direction Y, said acceleration sensor 50 forming part of the AHRS measurement instrument.

It should be observed that the air data computer ADC instrument and the AHRS instrument may form portions of a single measurement instrument known as an "air data, attitude and heading reference system" (ADAHRS).

Furthermore, the adjustment device includes control means 60, such as a microprocessor, suitable for ordering the deflection of said left and right flaps 45, 46 as a function of information coming from the first and second speed measurement means 51, 53, the force, angle, and acceleration sensors 56, 52, and 50, and also from the first and second torque sensors 54, 55.

Where necessary, and thus as a function of the logic program in the control means 60, the control means 60 order first control means 61, such as an electric actuator, to cause the left flap 45 to pivot about its fastener axis AX1 in order to modify its deflection angle relative to the left aerodynamic surface.

Likewise, said control means 60 are suitable for ordering second control means 62, such as an electric actuator, to cause the right flap 46 to pivot about its fastener axis AX2 to modify its deflection angle relative to the right aerodynamic surface.

With reference to FIG. 3, in a second variant, the adjustment device does not have first and second torque sensors 54, 55. In this second variant, use is made on the contrary of first and second pitch measurement means 57, 58 for measuring the first and second pitches β1 and β2 of the left and right propellers 21, 22.

It should be observed that since the first and second pitches β1, β2 are adjusted by actuators, the first and second pitch measurement means 57, 58 may be constituted by sensors for sensing the positions of said actuators.

Thus, as a function of the positions of the movable members of the actuators of the left and right propellers, the control means are in a position to deduce said first and second pitches β1, β2.

The control means 60, such as a microprocessor, are then able to order the deflection of said left and right flaps 45 and 46 as a function of information coming from the first and second speed measurement means 51, 53, from the force, angle, and acceleration sensors 56, 52, and 50, and from the first and second pitch measurement means 57 and 58.

Under such circumstances, the control means can activate adjustment of the deflection angles of the left and right flaps during predetermined stages of flight, specifically either flight at low speed or flight at high speed during a yaw-stabilized flight.

FIGS. 4 to 7 explain the operation of the rotorcraft at low speed, i.e. at a speed below a predetermined threshold indicated air speed IAS of the aircraft equal to about 50 knots (kts), i.e. 25.7 meters per second (m/s).

Since the main rotor 10 is driven in rotation by the engine installation in a first direction of rotation, thereby generating yaw torque on the fuselage 2 that is opposed in particular by a propeller urging a stream of air 21", 22" towards the rear of the aircraft, the control means 60 adjust the deflection angle α1, α2 of the flap 45, 46 that receives the air stream 21", 22" directed towards the rear by causing said flap 45, 46 to pivot in a second direction opposite to said first direction in order to cause it to reach a maximum deflection angle relative to the associated aerodynamic surface.

With reference to FIGS. 4 and 5, the main rotor turns clockwise as seen from above.

It is possible to envisage two limit procedures for use during low speed flight and in particular for use when hovering.

The first hovering flight procedure as shown in FIG. 4 consists in controlling the rotorcraft so that the left and right propellers 21 and 22 exert respective thrusts directed in opposite directions, one propeller exerting thrust of a value opposite to that of the other propeller in order to compensate the yaw torque exerted by the main rotor.

With the main rotor turning clockwise, the left propeller 21 exerts propulsive left thrust 21', the left air stream 21" generated by said left propeller 21 being directed towards the rear of the rotorcraft. In contrast, the right propeller 22 exerts non-propulsive right thrust 22', with the right air stream 22" generated by said right propeller 22 being directed towards the front of the rotorcraft.

The second hovering flight procedure shown in FIG. 5 consists in using the yaw control means so that one propeller exerts non-zero thrust towards the front and the other propeller exerts zero thrust. Since the main rotor 10 is turning clockwise, only the left propeller 21 exerts thrust 21', the left air stream 21" generated by said left propeller 21 being directed towards the rear of the rotorcraft.

Independently of the flight procedure, and independently of the variant of the adjustment device, the control means 60 regulate the deflection angle α1 of the left flap 45 by causing said left flap 45 to pivot counterclockwise F1 as seen from above about its fastener axis AX1 so as to cause it to reach its maximum deflection angle relative to the left aerodynamic surface 40.

The deflection angle α1 of the left flap 45 is then at its maximum.

In contrast, the control means 60 do not order the right flap 46 to be deflected, so the deflection angle α2 of the right flap 46 is zero.

It should be observed that the control means 60 regulate the left and right flaps 45 and 46 both when hovering and when flying at low speed, i.e. below a predetermined threshold of the indicated air speed (IAS) of the rotorcraft.

With reference to FIGS. 6 and 7, the main rotor is shown rotating in the counterclockwise direction as seen from above.

Independently of the flight procedure, and independently of the variant of the adjustment device, the control means 60 then regulate the deflection angle α2 of the right flap 46 by causing the right flap 46 to pivot in the clockwise direction F2 as seen from above about its fastener axis AX2 so as to reach a maximum deflection angle relative to the right aerodynamic surface 41.

The deflection angle α2 of the right flap 46 is then at a maximum.

In contrast, the control means 60 do not order the left flap 45 to deflect, so the deflection angle α1 of the left flap 45 is zero.

FIGS. 8 to 11 show the operation of the rotorcraft at high speed, i.e. above a predetermined threshold of the indicated air speed IAS of the aircraft equal to about 50 kts, i.e. 25.7 m/s.

When the indicated air speed IAS of the rotorcraft is greater than said predetermined threshold, the left and right propellers 21, 22 are both in propulsion mode and they generate respective left and right air streams 21" and 22" that are directed towards the rear of the rotorcraft, and more precisely towards the left and right aerodynamic surfaces 40 and 41.

Nevertheless, it should be observed that the pressure exerted by the left and right air streams is negligible relative to the pressure of the air due to the forward speed of the rotorcraft.

In this context, the control means activate adjustment of the deflection angles α1, α2 of the left and right flaps 45, 46 providing the following conditions of yaw-stabilized flight are satisfied:

|Ny|<0.075 times the acceleration due to gravity;
|Phi|<5 degrees;
|P|<10 degrees per second; and
the pilot is not exerting any force on the differential pitch control member, the rudder bar, this absence of force being detected by a force sensor 56;

where |Ny| represents the absolute value of the load factor of the rotorcraft in a transverse direction in the frame of reference of the rotorcraft, |Phi| represents the absolute value of the roll angle of the rotorcraft, and |P| represents the absolute value of the angular speed of the rotorcraft in roll.

In the first variant, the control means 60 then determine in real time a first difference ΔTq representing said second torque Tq2 minus said first torque Tq1 and:

order the left and right flaps 45 and 46 to deflect causing them to pivot clockwise when said first difference is greater than +2.5 percent;
order said left and right flaps 45 and 46 to deflect causing them to pivot counterclockwise when said first difference is less than −2.5 percent; and
maintain said left and right flaps 45 and 46 in position when said first difference lies in the range −2.5 percent to +2.5 percent.

In the second variant, the control means 60 determine in real time a second difference Δβ representing the second pitch β32 minus the first pitch β1 and:

order said left and right flaps to deflect by pivoting in the clockwise direction when the second difference is greater than 0.3 degrees;
order said left and right flaps to deflect by pivoting in the counterclockwise direction when the second difference is less than −0.3 degrees; and
maintain said left and right flaps in position when the second difference lies in the range −0.3 degrees to 0.3 degrees.

In the third variant, the control means 60 determine in real time:

a first power consumed by the left propeller equal to the first speed of rotation Ω1 of the left propeller multiplied by the first torque Tq1 generated by the left propeller, the first speed of rotation Ω1 and the first torque Tq1 being supplied respectively by a conventional first speed sensor and by the first torque sensor 54;
a second power consumed by the right propeller equal to the second speed of rotation Ω2 of the right propeller multiplied by the second torque Tq2 generated by the right propeller, the second speed of rotation Ω2 and the second torque Tq2 being supplied respectively by a conventional second speed sensor and by the second torque sensor 55; and
a third difference representing the second power minus the first power.

Under such circumstances, the control means:

order said left and right flaps to be deflected by causing them to pivot clockwise when said third difference is greater than +50 kilowatts;
order said left and right flaps to be deflected by pivoting counterclockwise when said third difference is less than −50 kilowatts; and
maintain said left and right flaps in position when said third difference lies in the range −50 kilowatts to +50 kilowatts.

It should be observed that unlike the control required at low speed, the control means at high speed do not order the left and right flaps to be fully deflected but order said left and right flaps to pivot continuously and progressively over time.

With reference to FIGS. 8 and 9, the main rotor is shown rotating in the clockwise direction seen from above.

In FIG. 8, if the first condition is satisfied, the control means order the left and right flaps 45 and 46 to pivot progressively in the clockwise direction F4', F4". In the first variant, the first condition is satisfied when the first difference ΔTq is greater than +2.5 percent whereas in the second variant, the first condition is satisfied when the second difference Δβ is greater than 0.3 degrees.

As shown in FIG. 9, if a second condition is satisfied, the control means order the left and right flaps 45 and 46 to pivot progressively counterclockwise F3', F3". In the first variant, the second condition is satisfied when the first difference ΔTq is less than −2.5 percent whereas, in the second variant, the second condition is satisfied when the second difference Δβ is less than −0.3 degrees.

Finally, if a third condition is satisfied, the control means do not order the left and right flaps to be deflected. In the first variant, the third condition is satisfied when the first difference ΔTq lies in the range −2.5 percent to +2.5 percent, whereas in the second variant the third condition is satisfied when the second difference Δβ lies in the range −0.3 degrees to 0.3 degrees.

In contrast, with reference to FIGS. 10 and 11, the main rotor is shown rotating in the counterclockwise direction when seen from above.

In FIG. 10, if said first condition is satisfied, the control means order the left and right flaps 45 and 46 to pivot progressively in the clockwise direction F5', F5".

As shown in FIG. 11, if said second condition is satisfied, the control means order the left and right flaps 45 and 46 to pivot progressively in the counterclockwise direction F6', F6".

Finally, if said third condition is satisfied, the control means do not order the left and right flaps to be deflected.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of optimizing the operation of a left propeller (21) and a right propeller (22) disposed on either side of the fuselage (2) of a rotorcraft (1) and suitable for generating respective propulsive air streams (21", 22"), said rotorcraft (1) having a main lift rotor (10) and a power plant (5) suitable for setting said left and right propellers (21, 22) and also said main rotor (10) into rotation, said rotorcraft (1) having a left aerodynamic surface (40) and a right aerodynamic surface (41) exerting transverse thrust and arranged respectively in line with said left and right propellers (21, 22) on a stabilizer (15) located in the vicinity of a rear end (AR) of said fuselage (2), said left and right aerodynamic surfaces (40, 41) having respective left and right flaps (45, 46) suitable for being deflected to present respective deflection angles ($\alpha$1, $\alpha$2) relative to the associated aerodynamic surfaces (40, 41), wherein when the yaw of said rotorcraft (1) is stabilized via first and second pitches of the left and right propellers (21, 22) respectively, regulation of the deflection angles ($\alpha$1, $\alpha$2) of the left and right flaps (45, 46) is activated only during predetermined stages of flight in order to minimize a differential pitch between the left and right propellers (21, 22) so as to optimize the operation of said left and right propellers (21, 22), said predetermined flight stages including the stages of low speed flight performed at an indicated air speed (IAS) of the rotorcraft less than a predetermined threshold, and stages of yaw-stabilized flight at high speed performed at an indicated air speed (IAS) of the rotorcraft above said predetermined threshold.

2. A method according to claim 1, wherein when the indicated air speed (IAS) of the rotorcraft is below a predetermined threshold, with the main rotor (10) being driven in rotation by said power plant (5) in a first direction of rotation and generating torque on said fuselage (2) that is opposed in particular by one propeller propelling a stream of air towards the rear of said rotorcraft (1), the deflection angle of the flap receiving said rearwardly-directed air stream is adjusted by causing said flap to pivot in a second direction opposite to said first direction in order to reach a maximum pivot angle relative to the associated aerodynamic surface.

3. A method according to claim 2, wherein when the indicated air speed (IAS) of the rotorcraft (1) is less than a predetermined threshold, with the main rotor (10) being rotated by said power plant (5) in a direction that is clockwise when seen from above, the deflection angle ($\alpha$1) of the left flap (45) is adjusted by causing the left flap (45) to pivot counterclockwise as seen from above so as to reach a maximum deflection angle ($\alpha$1) relative to the left aerodynamic surface (40).

4. A method according to claim 2, wherein when the indicated air speed (IAS) of the rotorcraft (1) is less than a predetermined threshold, with the main rotor (10) being rotated by said power plant (5) in a counterclockwise direction as seen from above, the angle of deflection ($\alpha$2) of the right flap (46) is adjusted by causing the right flap (46) to pivot clockwise as seen from above in order to reach a maximum deflection angle ($\alpha$2) relative to the right aerodynamic surface (41).

5. A method according to claim 1, wherein when said indicated air speed (IAS) of the rotorcraft (1) is greater than said predetermined threshold, adjustment of the deflection angles of said left and right flaps (45, 46) is activated if the following yaw-stabilized flight conditions are satisfied:

|Ny|<0.075 times the acceleration due to gravity;

|Phi|<5 degrees;

|P|<10 degrees per second; and no pilot is exerting force on a differential pitch control member suitable for ordering differential variation of the first and second pitches of the blades (6', 6") of the left and right propellers (21, 22);

where |Ny| represents the absolute value of the load factor of the rotorcraft in a transverse direction in the frame of reference of the rotorcraft, |Phi| represents the absolute value of the roll angle of the rotorcraft, and |P| represents the absolute value of the angular speed of roll of the rotorcraft.

6. A method according to claim 5, wherein with adjustment of the deflection angles ($\alpha$1, $\alpha$2) of said left and right flaps (45, 46) being activated, measurements are performed in real time of a first torque (Tq1) generated by the left propeller (21) as a percentage of the maximum torque and of a second torque (Tq2) generated by the right propeller (22) as a percentage of the maximum torque, and then a first difference ($\Delta$Tq) is determined in real time representing said second torque (Tq2) minus said first torque (Tq1) and:

deflection of said left and right flaps (45, 46) is ordered by causing them to pivot in the clockwise direction when said first difference ($\Delta$Tq) is greater than +2.5 percent;

deflection of said left and right flaps (45, 46) is ordered by causing them to pivot in the counterclockwise direction when said first difference ($\Delta$Tq) is less than −2.5 percent; and the positions of said left and right flaps (45, 46) are maintained when said first difference ($\Delta$Tq) lies in the range −2.5 percent to +2.5 percent.

7. A method according to claim 5, wherein with adjustment of the deflection angles ($\alpha$1, $\alpha$2) of said left and right flaps (45, 46) being activated, measurements are performed in real time of a first pitch ($\beta$1) of the left propeller (21) and of a second pitch ($\beta$2) of the right propeller (22), and then a second difference ($\Delta\beta$) is determined in real time representing said second pitch ($\beta$2) minus said first pitch ($\beta$1) and:

deflection of said left and right flaps (45, 46) is ordered causing them to pivot in the clockwise direction when said second difference ($\Delta\beta$) is greater than 0.3 degrees;

deflection of said left and right flaps (45, 46) is ordered causing them to pivot in the counterclockwise direction when said second difference ($\Delta\beta$) is less than −0.3 degrees; and said left and right flaps (45, 46) are maintained in position when said second difference ($\Delta\beta$) lies in the range −0.3 degrees to 0.3 degrees.

8. A method according to claim 5, wherein with adjustment of the deflection angles ($\alpha$1, $\alpha$2) of said left and right flaps (45, 46) being activated, there are determined in real time a first power consumed by the left propeller (21) and a second power consumed by the right propeller, and then a third difference is determined in real time representing the second power minus the first power and:

deflection of the left and right flaps is ordered causing them to pivot in the clockwise direction when said third difference is greater than +50 kilowatts;

deflection of the left and right flaps is ordered causing them to pivot in the counterclockwise direction when said third difference is less than −50 kilowatts; and the positions of said left and right flaps are maintained when said third difference lies in the range −50 kilowatts to +50 kilowatts.

9. A method according to claim 1, wherein said predetermined threshold is equal to 25.7 m/s.

10. A rotorcraft (1) provided with a main lift rotor (10) and also with a left propeller (21) and a right propeller (22) disposed on either side of a fuselage, said rotorcraft including a power plant suitable for setting said left and right propellers (21, 22) and said main rotor (10) in rotation, said rotorcraft (1) having a left aerodynamic surface (40) and a right aerodynamic surface (41) exerting transverse lift and arranged respectively in line with said left and right propellers (21, 22) on a stabilizer (15) located in the vicinity of a rear end (AR) of said fuselage (2), said left and right aerodynamic surfaces (40, 41) having respective left and right flaps (45, 46), said left and right flaps (45, 46) being suitable for being deflected respectively by first and second control means (61, 62) so as to present deflection angles relative to the associated aerodynamic surfaces (40, 41), the rotorcraft (1) comprising:

first speed measurement means (51) for measuring the indicated air speed (IAS) of said rotorcraft (1);

second speed measurement means (53) for measuring the angular speed in roll (P) of said rotorcraft (1);

a force sensor (56) suitable for determining whether a pilot is exerting a force on a differential pitch control member of the rotorcraft (1);

an angle sensor (52) measuring the roll angle (Phi) of the rotorcraft;

an acceleration sensor (50) measuring the load factor (Ny) of the rotorcraft in a transverse direction;

first and second torque sensors (54, 55) for sensing the respective torques of the left and right propellers (21, 22), or first and second pitch measurement means (57, 58) for measuring the respective pitches of the left and right propellers (21, 22), or first and second torque sensors (54, 55) for sensing the torques of the left and right propellers (21, 22) respectively and first and second rotary speed sensors for sensing the speeds of rotation ($\Omega 1, \Omega 2$) of the left and right propellers (21, 22) respectively; and control means (60) programmed to cause said left and right flaps (45, 46) to be deflected by implementing the method according to claim 1 and with the help of the first and second speed measurement means (51, 53), the force, angle, and acceleration sensors (56, 52, 50), and of the first and second torque sensors (54, 55) or the first and second pitch measurement means (57, 58), or the first and second toque sensors and the first and second rotary speed sensors.

11. A rotorcraft according to claim 10, wherein said rotorcraft (1) is a hybrid helicopter, the speeds of rotation at the outlets from the turbine engines (5), of the left and right propellers (21, 22), of the main rotor (10), and of a mechanical transmission interconnecting said turbine engine(s) (5), said propellers (21, 22), and said rotor (10) are proportional to one another, the proportionality ratios being constant regardless of the flight configuration of the hybrid helicopter under normal conditions of use of the integrated drive system.

* * * * *